(12) United States Patent
Schmidt et al.

(10) Patent No.: US 11,149,783 B2
(45) Date of Patent: Oct. 19, 2021

(54) ASSEMBLY WITH TOLERANCE ABSORBING SPACER

(71) Applicant: Zhejiang Ruitai Suspension System Technology LTD, Ningbo (CN)

(72) Inventors: George R. Schmidt, St. Louis, MO (US); Haibin Jiang, Fenghua (CN); Lu Jian, Ballwin, MO (US)

(73) Assignee: Zhejiang Ruitai Suspension System Technology LTD, Zhejiang Province (CN)

( * ) Notice: Subject to any disclaimer, the term of this patent is extended or adjusted under 35 U.S.C. 154(b) by 758 days.

(21) Appl. No.: 15/947,833

(22) Filed: Apr. 8, 2018

(65) Prior Publication Data

US 2019/0309793 A1  Oct. 10, 2019

(51) Int. Cl.
*F16C 11/06* (2006.01)
*B60D 1/06* (2006.01)

(52) U.S. Cl.
CPC ............ *F16C 11/0623* (2013.01); *B60D 1/06* (2013.01)

(58) Field of Classification Search
CPC .............. F16C 11/0642; F16C 11/0647; F16C 11/0652; F16C 11/08; F16C 11/0623; F16C 11/0695; Y10T 403/32713; Y10T 403/32762; Y10T 403/32811
USPC ....... 384/190, 203, 209, 211, 215, 517, 520, 384/522, 551
See application file for complete search history.

(56) References Cited

U.S. PATENT DOCUMENTS 1,863,343 A * 6/1932 Kunkle ............... F16C 11/0628
                                                          403/139
2,544,583 A * 3/1951 Booth ................. F16C 11/0609
                                                          403/127
(Continued)

FOREIGN PATENT DOCUMENTS

GN   202867508 U   4/2013
GN   104641142 A   5/2015

OTHER PUBLICATIONS

Search Report in corresponding Pcr 201910269585X.
(Continued)

*Primary Examiner* — Amber R Anderson
*Assistant Examiner* — Alexus Camero
(74) *Attorney, Agent, or Firm* — Grace J. Fishel (57) ABSTRACT

A tolerance absorbing spacer for controlling manufacturing dimensional tolerance variation in products made with multiple internal components, each requiring unique dimensional tolerance allowance. This component adjusts and compensates for the resulting overall cumulative component height variation within an assembly of components, sometimes referred to as "stack height" by compensating for the maximum to minimum range of possible assembly heights, compressing and yielding under applied external force until all excess internal clearance is removed, except for a small, and desirable remaining clearance. This component yields and becomes essentially fully plastic, to provide the necessary tolerance adjustment feature only after reaching a predetermined, minimum force which exceeds all applied forces the component could reasonably encounter in service use and below which, the tolerance absorbing spacer remains fully rigid.

6 Claims, 10 Drawing Sheets

(56) References Cited

U.S. PATENT DOCUMENTS

| | | | | |
|---|---|---|---|---|
| 2,993,717 A * | 7/1961 | Gottschald | | F16C 11/06 |
| | | | | 403/133 |
| 3,516,717 A * | 6/1970 | Peterson | | F16C 19/52 |
| | | | | 384/517 |
| 3,667,789 A * | 6/1972 | McNeely | | F16C 11/0619 |
| | | | | 403/128 |
| 3,945,737 A * | 3/1976 | Herbenar | | F16C 11/083 |
| | | | | 403/27 |
| 4,333,132 A * | 6/1982 | Paley | | F21V 21/29 |
| | | | | 362/389 |
| 4,478,531 A * | 10/1984 | Levinson | | B62D 7/18 |
| | | | | 280/93.511 |
| 6,413,003 B1 * | 7/2002 | Schmidt | | B62D 7/16 |
| | | | | 403/120 |
| 6,840,697 B1 * | 1/2005 | Dorr | | F16C 11/0638 |
| | | | | 403/133 |
| 8,454,290 B2 * | 6/2013 | Schaser | | F16B 43/001 |
| | | | | 411/544 |
| 8,875,683 B2 * | 11/2014 | Holt | | F16F 1/32 |
| | | | | 123/470 |
| 9,297,297 B2 * | 3/2016 | Chu | | F02B 37/12 |
| 9,845,823 B1 * | 12/2017 | Yaworsky | | B62D 7/166 |
| 2006/0140712 A1 * | 6/2006 | Sun | | F16C 11/069 |
| | | | | 403/135 |

OTHER PUBLICATIONS

First Office Action in corresponding Pcr 201910269585X.
English translation of Search Report in corresponding PCR 201910269585X.
English translation of First Office Action in corresponding PCR 201910269585X.
English translation of CN104641142.
English translation of CN202867508.

* cited by examiner

ASSEMBLY WITH TOLERANCE ABSORBING SPACER

BACKGROUND OF THE INVENTION

Field of the Invention

The present invention relates to a tolerance absorbing spacer for controlling manufacturing dimensional tolerance variation in products made with multiple internal components, each requiring unique dimensional tolerance allowance.

Brief Description of the Prior Art

In the construction of an automobile socket such as a ball joint or tie rod end, for use as a chassis pivot, and made up of several cooperating components, whether the primary bearings are constructed of rigid metal bearing surfaces or less rigid, polymer bearing construction, or a combination thereof, there is a problem of controlling the cumulative clearance within the socket, due to required tolerance considerations of each internal component. It is well known in the industry, that for sockets used in this environment to survive a long life, and to possess the required initial rotation and articulation torque characteristics of the stud relative to the socket housing, the initial clearances within the socket must be well controlled from the initial use, and consistent from one part to the next. This is necessary to avoid components from being compressed against one another too tightly and creating abnormally high friction during movement of the ball stud relative to the socket, if clearance is insufficient, and from internal components impacting upon one another from forces encountered during severe use, if too loose.

In U.S. Pat. No. 3,667,789 of Moog Industries, a tolerance control spacer was described. The tolerance absorbing spacer described herein has a more consistent and predictable resilience, from required maximum to minimum assembly cumulative tolerance range of use, resulting in a significantly more consistent and controllable level of internal clearance, and therefore, consistent rotation and articulation torque characteristics of the stud, relative to the housing, as well as more consistent life expectancy of the finished assembly.

BRIEF SUMMARY OF THE INVENTION

In accordance with the present invention a manufactured assembly of more than one component, wherein each internal component requires tolerance that can affect axial positioning within the assembly, includes a wave shaped tolerance absorbing spacer, which during the assembly process, is pre-compressed by an external tool prior to final assembly, to plastically deform said wave shaped tolerance compensating spacer in cooperation with the other components in said assembly, in order to remove all undesirable accumulated internal clearance between components, and accurately set and maintain desired assembly operating clearance to any level, and maintain this within a very limited range of variation from one part to the next, and from one production run to the next.

In an automotive chassis socket for use as a ball joint, tie rod end, idler arm, or the like, that must allow pivoting motion in a rotary and/or spherical manner, with cooperating components as per above and including a housing with one or two primary openings, at least one of which allows for passage of a stud member for cooperation with a cooperating chassis component, and which includes one or more bearing components or bearing surfaces in contact with the head of the stud to support the rotation and/or spherical pivoting motion, a closing plate or closing ring, and optionally, an elastic preload member wherein said wave shaped tolerance absorbing spacer is pre-compressed to a plastic state, to remove all undesirable cumulative axial component tolerance prior to final closing of the socket, by providing a limited and constant resilience over the full operating range of expected, axial tolerances, created by allowable tolerance limits required for manufacture of each component within the assembly.

In some embodiments, the wave shaped, tolerance compensating spacer is composed of a series of evenly spaced waves, with constant amplitude from OD to ID for each wave, composed of one or more blended radii in and around the wave peaks, extending from the plane of an initially flat disc and blended evenly with additional extended length radii or with straight wave segments, above and below the original plane of the disc.

In other forms the force required to compress said the tolerance compensating spacer to the point of plastic deformation can be adjusted by varying the number of waves, the thickness of the base material used to form the component, the ratio of OD to ID of the disc used for form the waves, the grade and type of the material used for construction of the component, the amplitude of the waves, or any combination of these parameters.

The tolerance absorbing component for use in the above embodiments due to its unique geometry, demonstrates greatly improved resistance and stability to applied force after reaching the point of plastic deformation, and maintains this level of resisting force for an extended range of operation sufficient to compensate for cumulative tolerance variations of the assembly socket and all components therein.

The tolerance absorbing component for use above due to its shape, demonstrates significantly reduced change in OD and ID as it is plastically deformed, compared with prior art devices of similar function, allowing it to be used in narrow passages without tendency to expand and stick against the sidewall confines of its operating space.

Also the wave shaped, tolerance absorbing spacer due to its shape, demonstrates reduced, and significantly more consistent elastic spring back as compared to prior art configurations, after reaching the plastic deformation region of its compression, and within the full required operating range of tolerance absorption, as dictated by the cumulative tolerance for all components used in said socket assembly, thereby providing for improved capability to control variation of clearance in each socket assembly within a production run, and from one production run to the next.

In some wave shaped, tolerance absorbing spacers the spacing between waves can be uneven and where individual wave shapes can have varying amplitude and can have various single, or multi radii profiles from one peak to the next including but not limited to a sine wave shape.

Other variations include a socket assembly in which the bearings or bearing surfaces can be composed of metal or polymer materials, or a combination of both.

In another manufactured assembly of more than one component, wherein each internal component requires tolerance that affects axial positioning within the assembly, and which includes a tolerance absorbing spacer with multiple cylindrical or conical extended protrusions extending vertically from a base, or elevated intermediate platform, which during the assembly process, is pre-compressed by an external tool prior to final assembly, to plastically deform the tolerance compensating spacer in cooperation with the other components in said assembly, in order to remove all undesirable accumulated internal clearance between components, and accurately set and maintain desired assembly operating clearance to any level, and maintain this within a very limited range of variation from one part to the next, and from one production run to the next.

In an automotive chassis socket for use as a ball joint, tie rod end, idler arm, or the like, that must allow pivoting motion in a rotary and/or spherical manner, with cooperating components as per the manufactured assembly described above, including a housing with one or two primary openings, at least one of which allows for passage of a stud member for cooperation with an adjoining chassis component, which includes one or more bearing components or bearing surfaces in contact with the head of the stud to support the rotation and/or spherical pivoting motion, a tolerance absorbing spacer with multiple cylindrical or conical extended protrusions from a base, or elevated intermediate platform, a closing plate or closing ring, and optionally, an elastic preload member wherein said tolerance absorbing spacer is pre-compressed to a plastic state, to remove all undesirable cumulative axial component tolerance, by providing a limited and constant resilience over the full operating range of expected, axial tolerances, created by allowable tolerance limits set for each component within the assembly.

A tolerance absorbing spacer for use in the manufactured assembly or automotive chassis socket with multiple cylindrical or conical extended protrusions from a base, or elevated intermediate platform that is composed of a series of evenly or non-evenly spaced, conical or cylindrical protrusions, or any combination thereof, extending vertically from the plane of an initially flat disc.

In other forms, a tolerance absorbing spacer for use in the manufactured assembly or automotive chassis socket has multiple cylindrical or conical extended protrusions from a base, or elevated intermediate platform in which the force required to compress to plastic deformation can be adjusted by varying the number of protrusions, the thickness of the base material used to form the component, the number of generally annular rings of protrusions contained between OD and ID, the grade and type of the material used for construction of the component, the amplitude of the protrusions, or any combination of these parameters.

Otherwise the tolerance absorbing spacer may have multiple cylindrical or conical extended protrusions from a base, or elevated intermediate platform that due to its unique geometry, demonstrates greatly improved resistance and stability to applied force after reaching the point of plastic deformation for an extended distance sufficient to compensate for the accumulation of all combinations of individual component tolerances that make up the assembly.

Still further the tolerance absorbing spacer for use in the manufactured assembly or automotive chassis socket may have multiple cylindrical or conical extended protrusions from a base, or elevated intermediate platform that due to its shape, demonstrates significantly reduced change in OD and ID as it is plastically deformed, compared to prior art devices of similar function, allowing it to be used in narrow passages without tendency to expand and stick against the sidewall confines of its operating space.

In a form, the tolerance absorbing spacer has multiple cylindrical or conical extended protrusions from a base, or elevated intermediate platform that due to its shape, demonstrates minimal and more consistent elastic spring back as compared to prior art configurations, after reaching the plastic deformation point within its required operating range, thereby providing for improved ability to control the amount and variation of clearance in every assembly within a production run, and well as from one production run to the next.

In various embodiments the socket assembly for use in the manufactured assembly or automotive chassis the bearings or bearing surfaces can be composed of metal or polymer materials, or a combination of both.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
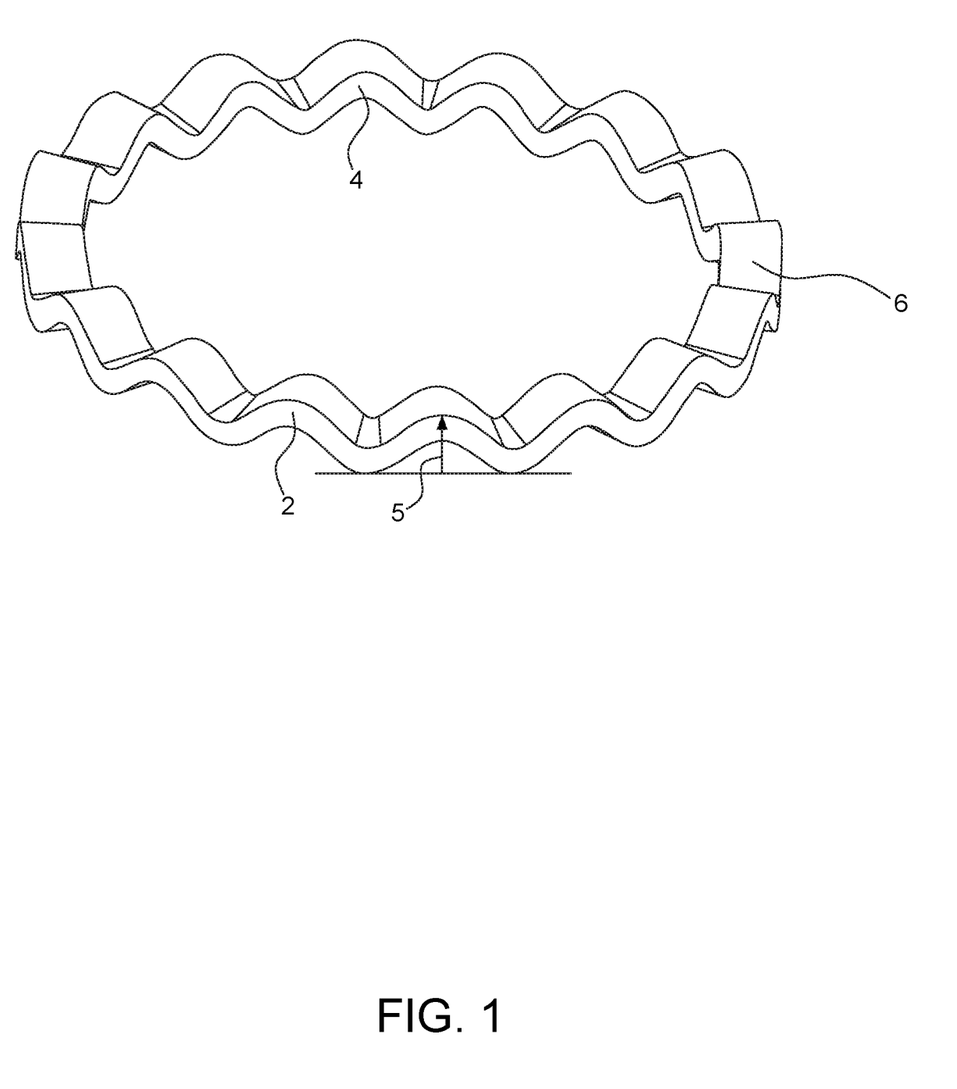
FIG. 1 is a perspective view of a first tolerance absorbing spacer in accordance with the present invention.
Figure 7:
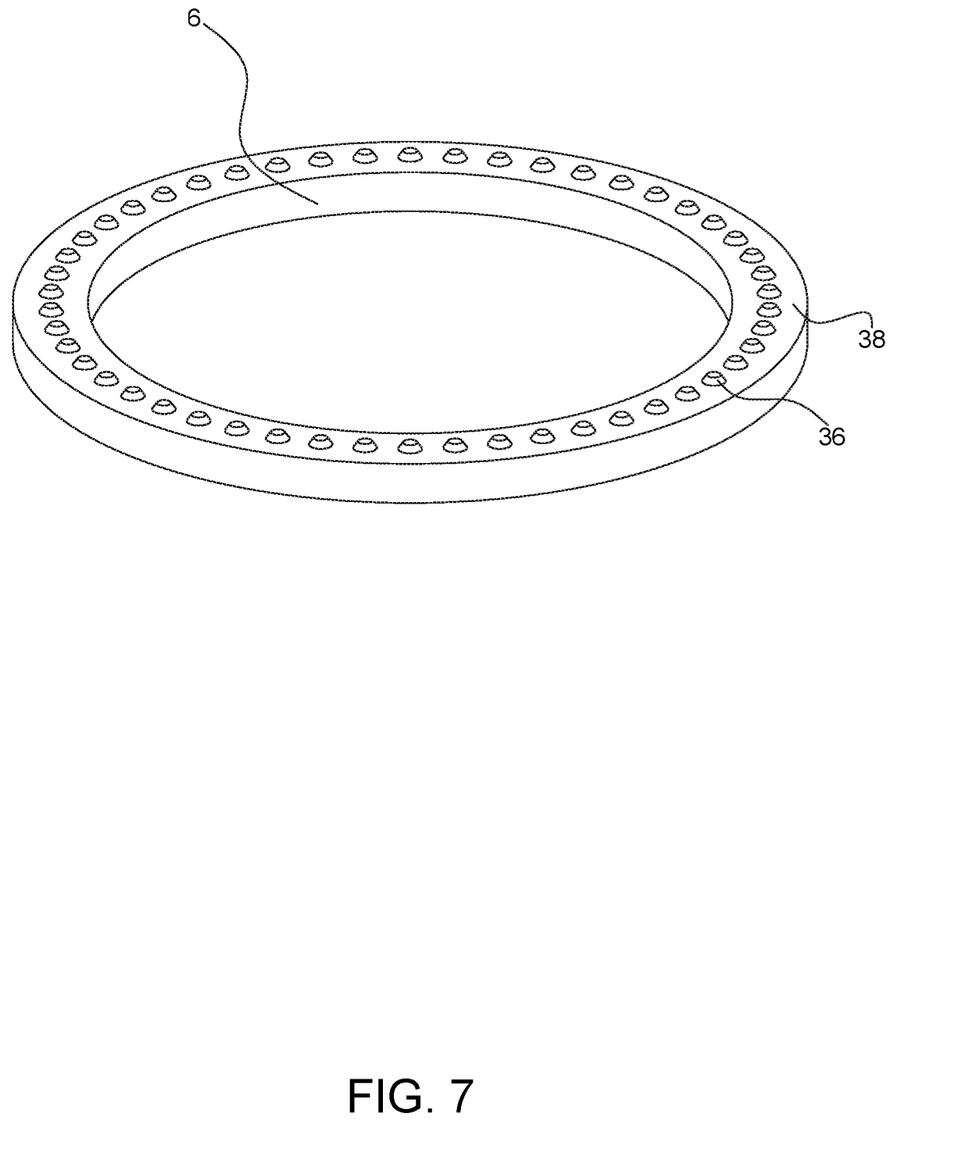
FIG. 7 is a perspective view of a second tolerance absorbing spacer.
Figure 8:
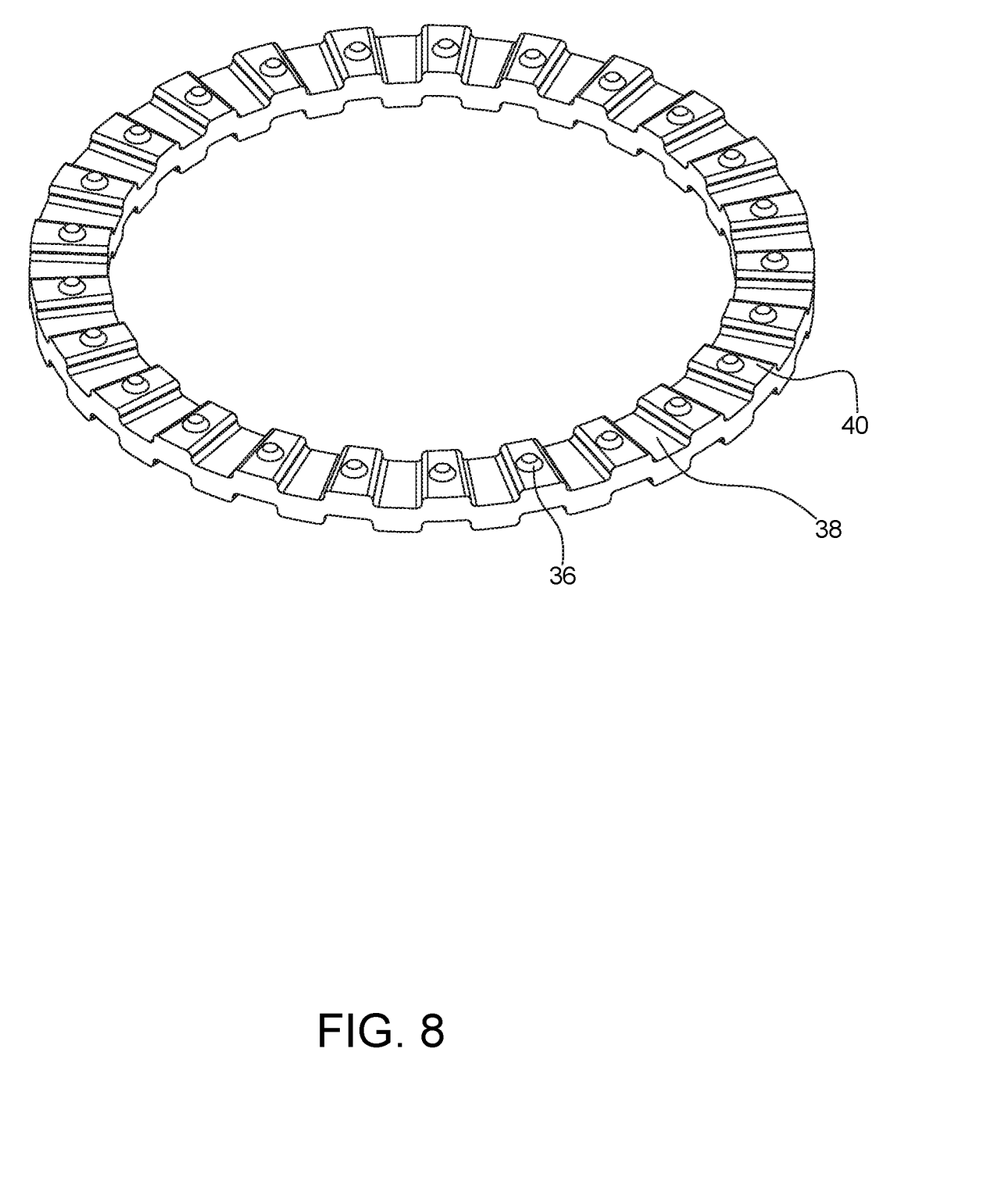
FIG. 8 is a perspective view of a third tolerance absorbing spacer.

Referring to the drawings more particularly by reference character an improved tolerance absorbing spacer is shown in FIGS. 1, 7 and 8 that will plastically deform to an appropriate height, under sufficiently high applied force, thereby controlling cumulate part-to-part assembly height variation or "axial stack height" caused by non-uniform component variation in manufactured assemblies, thereby making each finished assembly, which is composed of multiple components of slightly different dimensions from one part to the next, essentially identical and controllable, regarding final assembly internal operating clearance.

As shown in FIG. 1, tolerance absorbing spacer 6 formed as a flat annulus with a plurality of wave forms in the axial direction and extending around the annulus. In the illustrated embodiment, there are multiple waves, evenly spaced around the perimeter of the annulus. As a result, there is slight greater spacing of the waves 2 at the OD relative to the spacing of the waves 4 at the ID with constant amplitude 5. Because the wave peaks are composed of equal radii top and bottom the part is symmetrical such that it can be installed with either face up. The wave peaks may be connected by straight sections which blend into each radius, or by radii of generally greater length approaching a straight surface. Changes in the number of waves, material thickness, material composition, ratio of ID to OD, all will affect the resistance to applied force before the component is permanently elastically deformed. Any of these parameters can be varied as needed to fit the space, strength and working range for each individual application. Of course, it is also possible to vary the spacing of the waves around the perimeter, the height of one wave relative to another, and the shape profile of the individual waves as shown FIGS. 7 and 8. Alternative wave shapes and spacing should therefore be considered within the scope of the invention.

Figure 2:
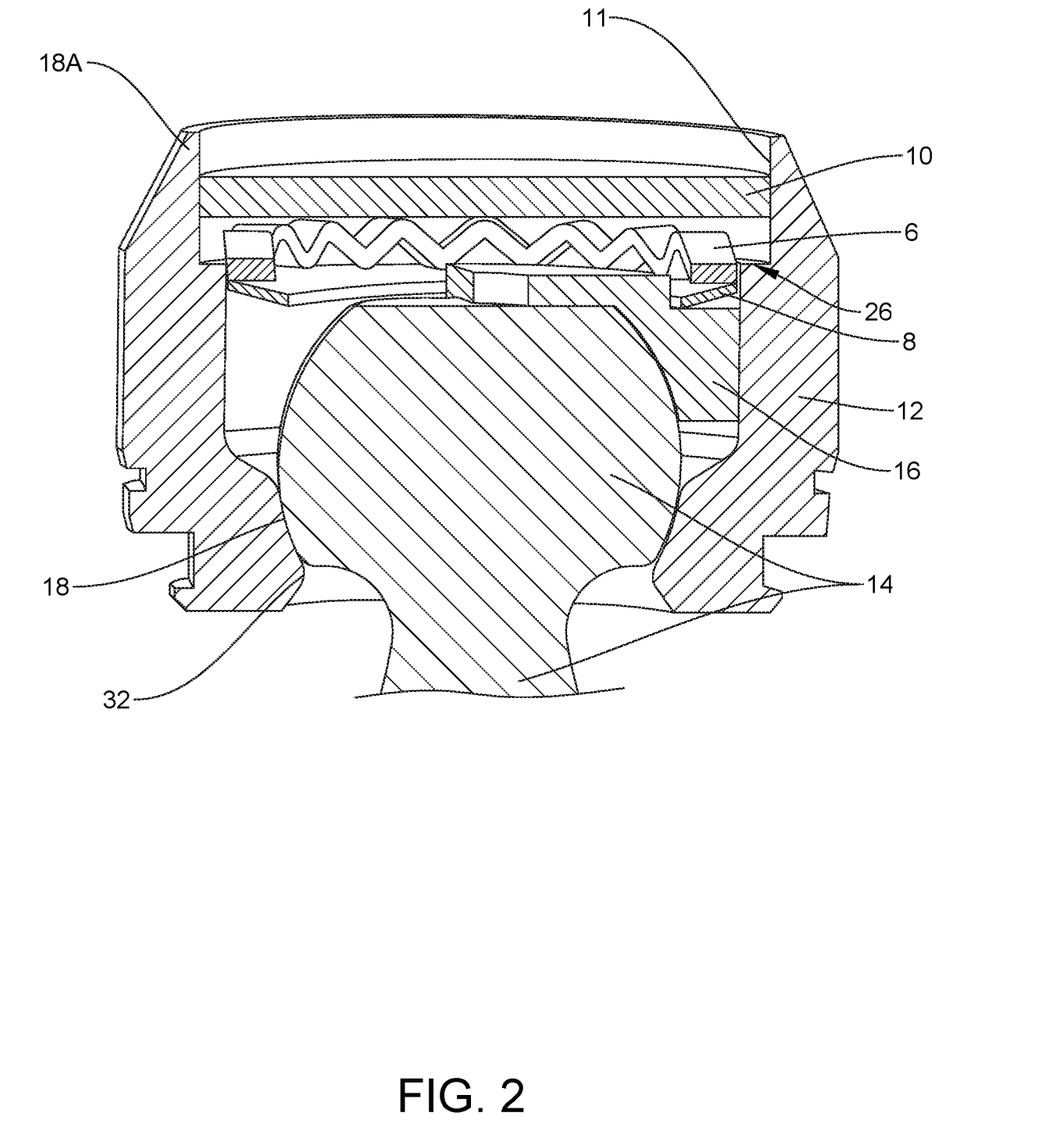
FIG. 2 is a sectional view of a metal or combined metal-polymer joint in a housing with a first concave bearing in the housing and a second concave bearing surface in a bearing plate, said first and second concave bearing surfaces axially aligned in the housing, and with the tolerance absorbing spacer inserted between a housing cover plate which rests on a fixed shelf inside the socket and the concave bearing surface in the bearing plate shown prior to conditioning.

In FIG. 2, tolerance absorbing spacer 6 is shown in an unassembled and uncompressed socket arrangement along with housing 12. Other cooperating components include cover plate 10, Belleville preload spring 8, upper bearing 16, partial view of ball stud 14 used for rotary and articulating connection to a cooperating chassis part, and which is resting on an integral, hardened lower concave bearing surface 18 of housing 12. Stud 14 exits the housing for attachment to cooperating chassis part through aperture 32. Together these components depict a chassis part socket that can be assembled through opening 11 and processed as will be described in the following description to minimize part to part variation in cumulative internal clearance, and thereby maintain very consistent performance characteristics from one part to the next. This style of ball joint is used in tension loaded applications where the socket must carry the weight of the vehicle in a direction that pulls the stud away from the socket, in addition to the added required function of locating the wheel for pivoting action of the vehicle suspension during steering and during vertical articulation of the wheel. This general style of socket is also used for follower ball joint applications with a function only to locate the wheel for pivoting action during steering and vertical articulation of the wheel.

Figure 3:
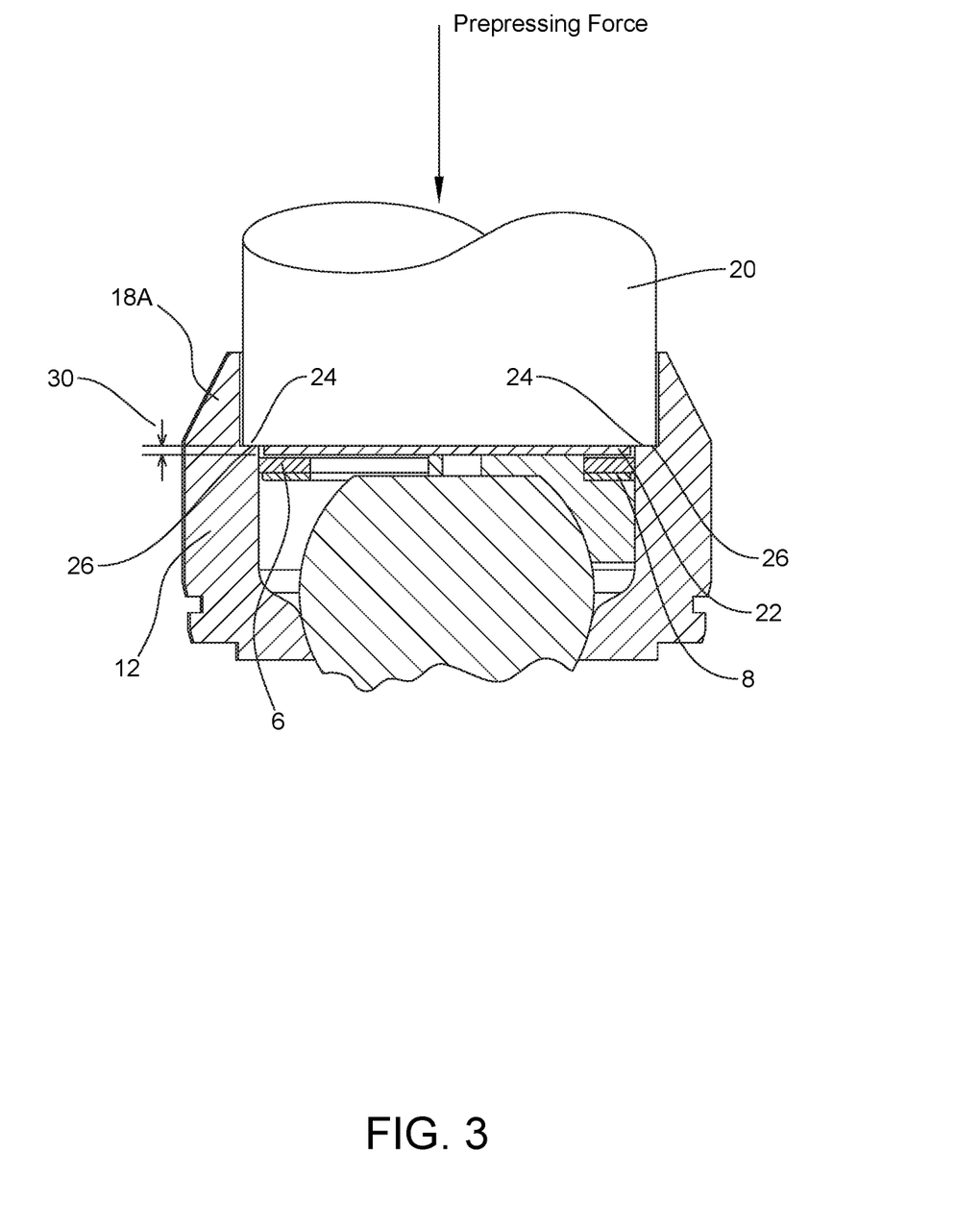
FIG. 3 is a sectional view of a method of assembly of the components of the joint shown in FIG. 2 to show the pre-conditioning of the tolerance absorbing spacer.

In FIG. 3, the components are shown in a fully compressed position under the applied force of an external pressing tool 20 to plastically deform the tolerance absorbing spacer 6 leaving a consistent amount of spring back to remove cumulative tolerance cause by non-uniform component variation from one part to the next. It will be noted that a small step 22 is included on the end of the external pressing tool 20 to provide a clearance space for a small, consistent amount of spring back of the tolerance absorbing spacer 6 and additionally to provide a small working space for the Belleville or other elastic preload device 8, if used. The pressing tool 20 advances in the housing 12 until outer, lower edges 24 make contact with a fixed, cover plate resting step 26. Once the internal components are compressed and the pressing tool reaches the cover plate step 26, the tolerance absorbing spacer 6 has been plastically deformed to remove all undesirable, excess assembly clearance within the socket, and the pressing tool 20 is withdrawn. Elastic preload device 8 such as a Belleville spring or wave spring for instance will recover to its unloaded state. The tolerance absorbing spacer 6 will also rebound a very small, but consistent amount. The small step 22 on external pressing tool 20 provides a small, desirable space 28 (FIG. 4) for the elastic preload device 8 to operate. The sum of the slight resilience from the compressed tolerance absorbing spacer 6 and the desired additional operating clearance 30 for the elastic preload device 8 determine the needed height of step 22 on external pressing tool 20.

Figure 4:
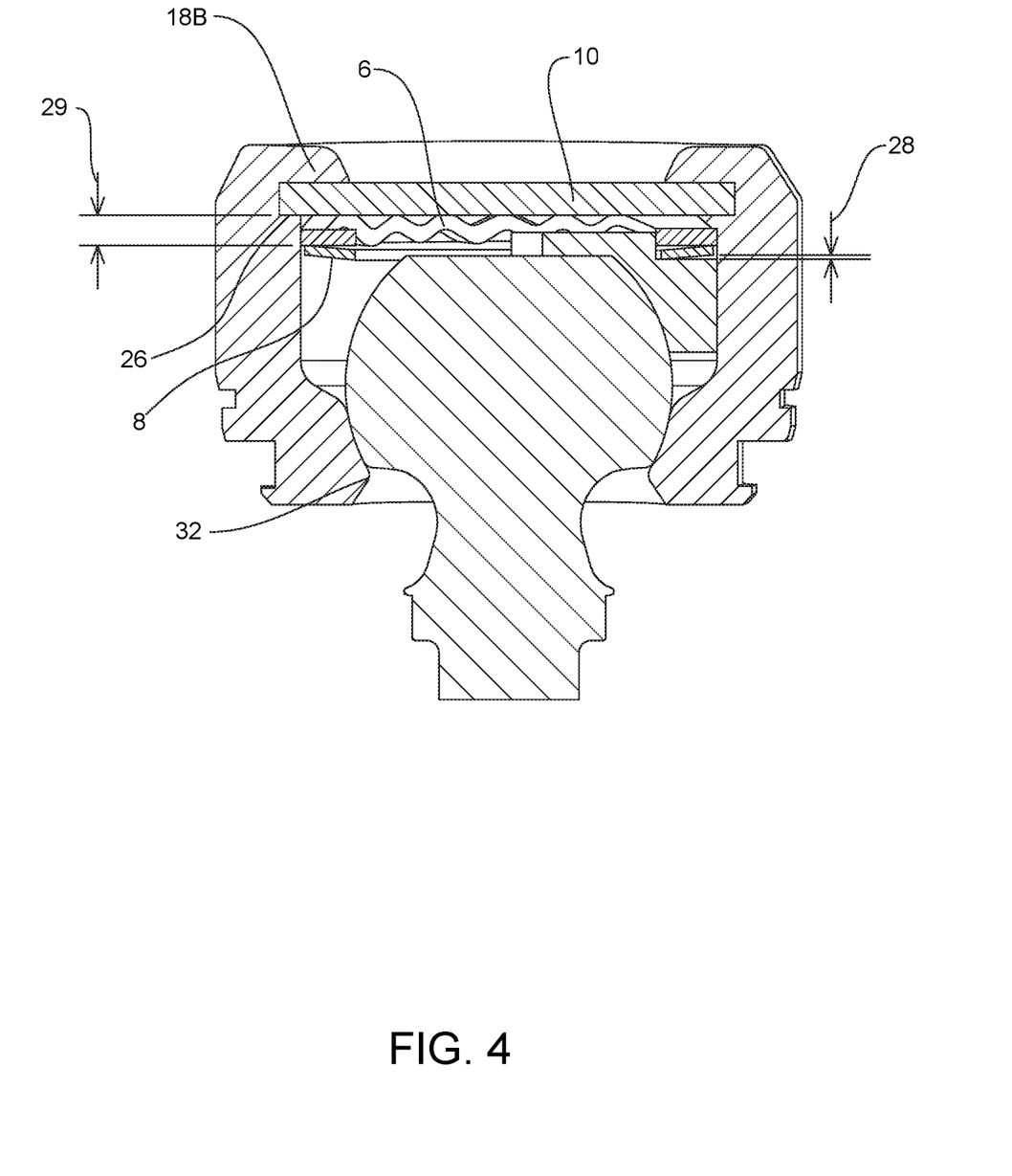
FIG. 4 is a sectional view of the joint shown in FIG. 2 after pre-conditioning and with the housing cover plate sealed in the housing with undersized, but within tolerance internal components, depicting a low axial stack height condition.

FIG. 4 shows the socket in finished condition for components depicting an extreme cumulative axial tolerance condition that creates the lowest overall component axial stack height, and therefore the least amount of plastic deformation within the tolerance absorbing spacer 6. In this view the socket has been mechanically closed as by crimping, metal spinning or welding of the upper edge of the housing initially depicted by 18A in FIG. 2, to lock the cover plate 10 against step 26 to a condition depicted by 18B after the socket closure in FIG. 4. The final socket operating clearance space after closure is noted as 28.

Figure 5:
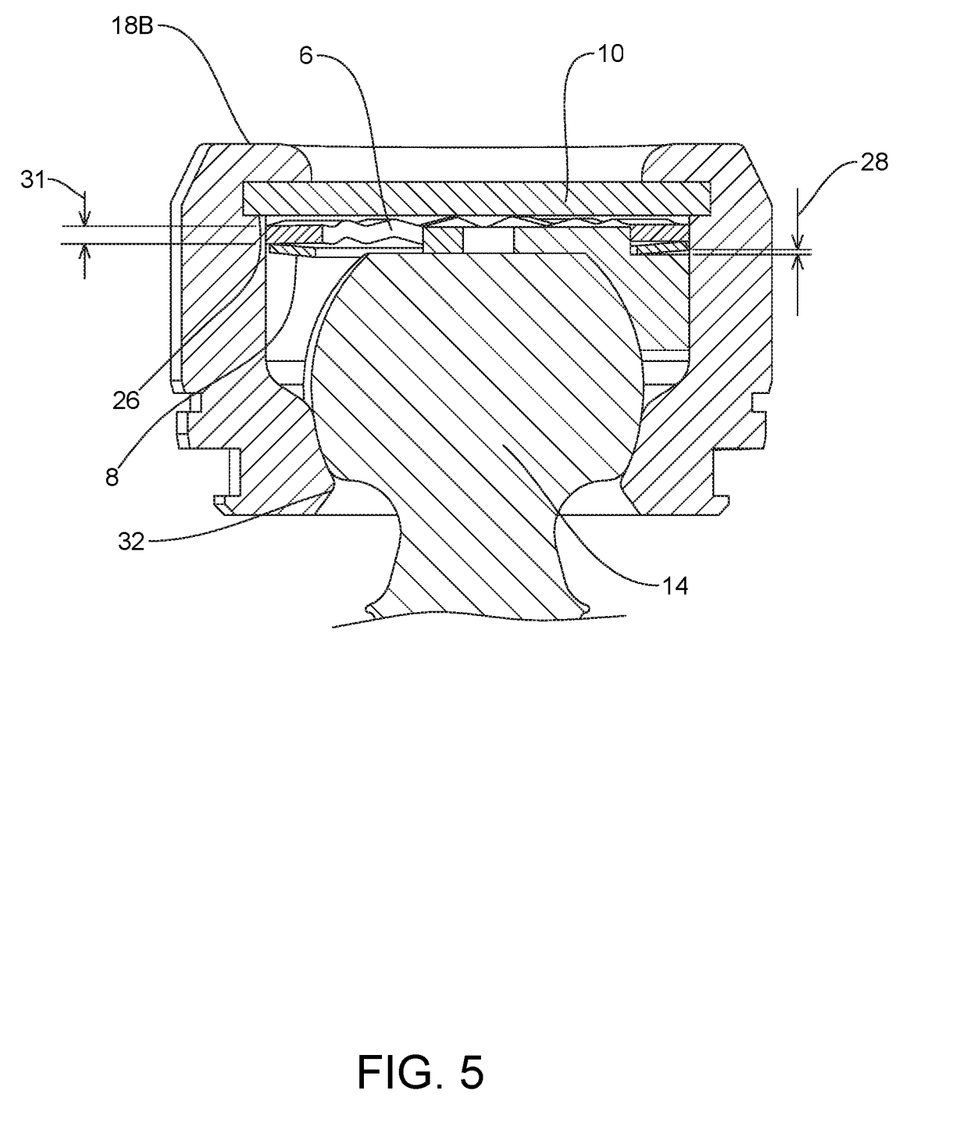
FIG. 5 is a sectional view of the joint shown in FIG. 2 after pre-conditioning and with housing cover plate sealed in the housing with oversized, but within tolerance internal components, depicting a high axial stack height condition.

In FIG. 5, the socket is shown in finished condition for components with an extreme tolerance condition that creates the highest overall component axial stack height and therefore the greatest amount of plastic deformation within the tolerance absorbing spacer 6. The final height of the wave shaped tolerance absorbing spacer 6 in this view is depicted by 31. It should be noted an important function of the tolerance absorbing spacer 6 is to maintain desired operating space 28 as consistent as possible, for all cumulative component tolerance combinations. This tolerance absorbing spacer compensates for maximum material condition dimensions for each and every individual component specification and for minimum allowable material condition dimensions for each and every component. It can be seen in comparing FIGS. 4 and 5 that although the wave shaped tolerance absorbing spacer 6 has been compressed to different final heights 29 and 31, the final socket clearance space 28 remains the same. In this view as with FIG. 4, the socket has been mechanically closed locking the cover plate 10 against step 26 as by crimping, metal spinning or welding of the upper edge of the housing 18A to a condition noted as 18B after socket closure.

Figure 6:
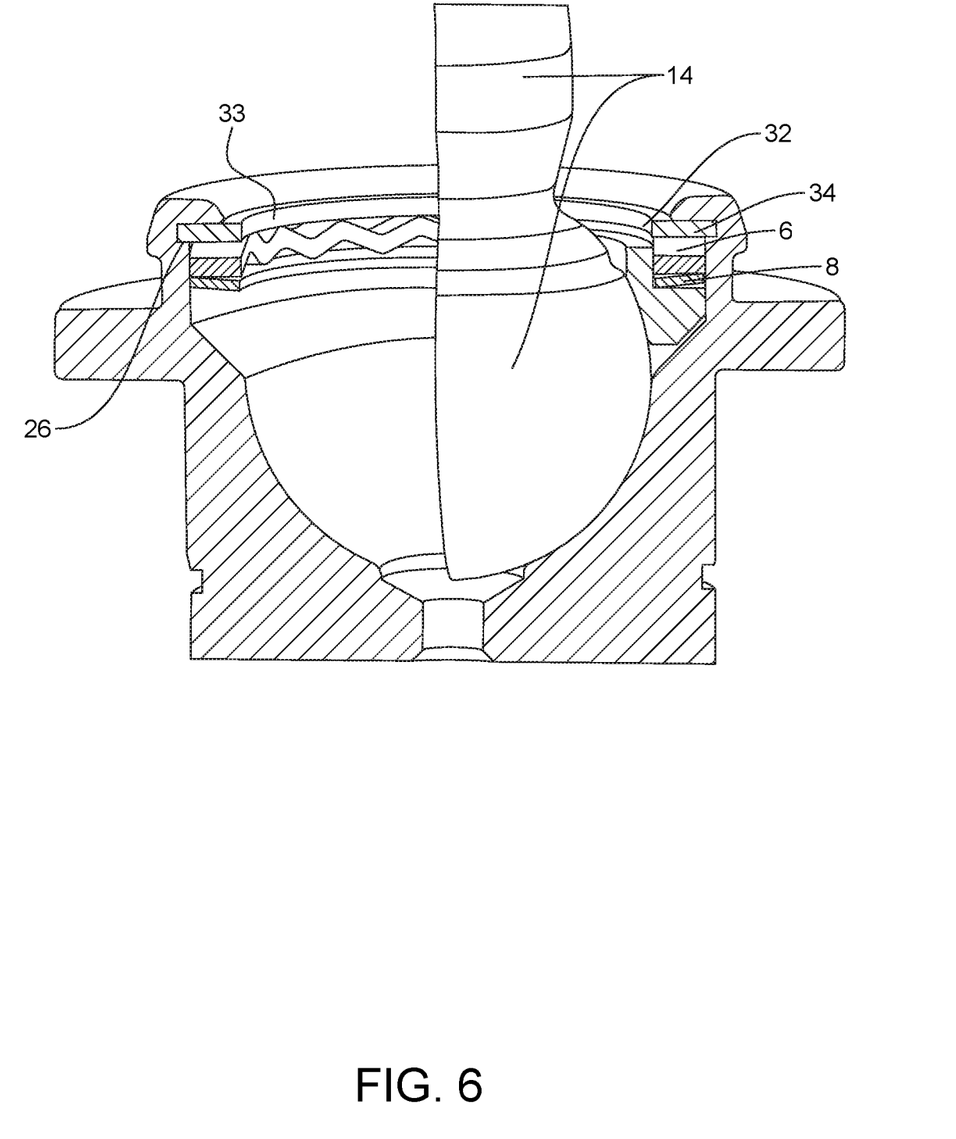
FIG. 6 is a sectional view of a different type of joint with metal bearing surfaces or a combination of metal and polymer bearings as used in some regular or heavy duty, compression loaded ball joint applications.

FIG. 6 shows an alternative ball socket in finished condition where the aperture 32 for the ball stud 14 is created by the inside edge 33 of closure ring 34 rather than cover plate 10. Closure ring 34 is locked against step 26 as with the other socket styles discussed previously. The opening for initially inserting components into the socket for assembly is therefore shared with the aperture for ball stud 14 to exit the housing and attached to a cooperating chassis part by various means. In this socket configuration, it can be seen that there is limited space between the OD and ID for the elastic preload device if used, and for the tolerance absorbing spacer 6 in this configuration. This style of joint carries the weight of the vehicle by pushing the stud into the socket. As with the joints described earlier, this type of ball joint socket also has the function of locating the wheel for pivoting action of the vehicle suspension during steering and vertical articulation of the wheel.

An alternative tolerance absorbing spacer 6 is shown in FIG. 7. Cylindrical or conical shaped pins with a flat top are extruded vertically from the base of disc 38. Like the tolerance absorbing spacer 6 shown in FIG. 1, the alternative tolerance absorbing spacer accomplishes the same improved results of limited OD and ID change during compression, constant and limited resilient after plastic deformation of the pins under applied external force, and stable force once the minimum required force for plastic deformation has been met.

In FIG. 8 another tolerance absorbing spacer 6 is shown. The radial waves may be viewed as square waves and as a variant on the pins in the tolerance absorbing spacer 6 shown in FIG. 7. Seen in the latter light, extruded pins 36 are placed on a flight of raised planes 40 about the base plane of disc 38. These planes may be formed of straight raised segments between OD and ID or alternatively by curved or partially circular platforms extending between the OD and ID of the tolerance absorbing spacer 6.

Figure 9:
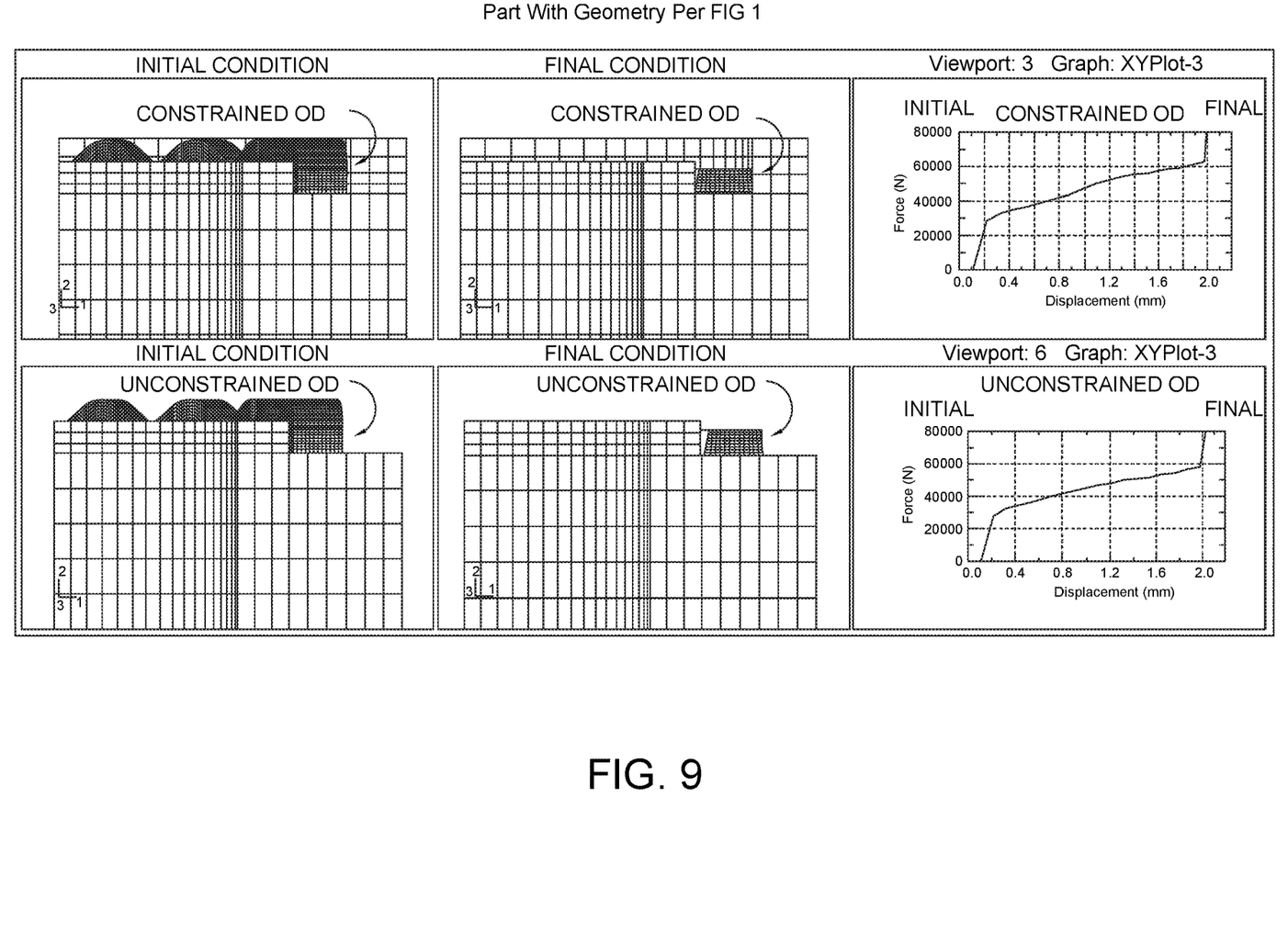
FIG. 9 is a Finite Element diagram of a wave shaped tolerance absorbing spacer of FIG. 1, both in a unrestricted compression environment, and in a confined space with vertical walls near both the OD and ID of the spacer, the force displacement curves show the output in each case, one with ID/OD confinement, and the other without; and, FIG. 10 is a comparative Finite Element diagram of a tolerance control spacer of similar geometry to that shown in the Moog patent discussed above showing the same surrounding constraints (with and without ID/OD confinement), and resulting force displacement curves associated with each.
Figure 10:
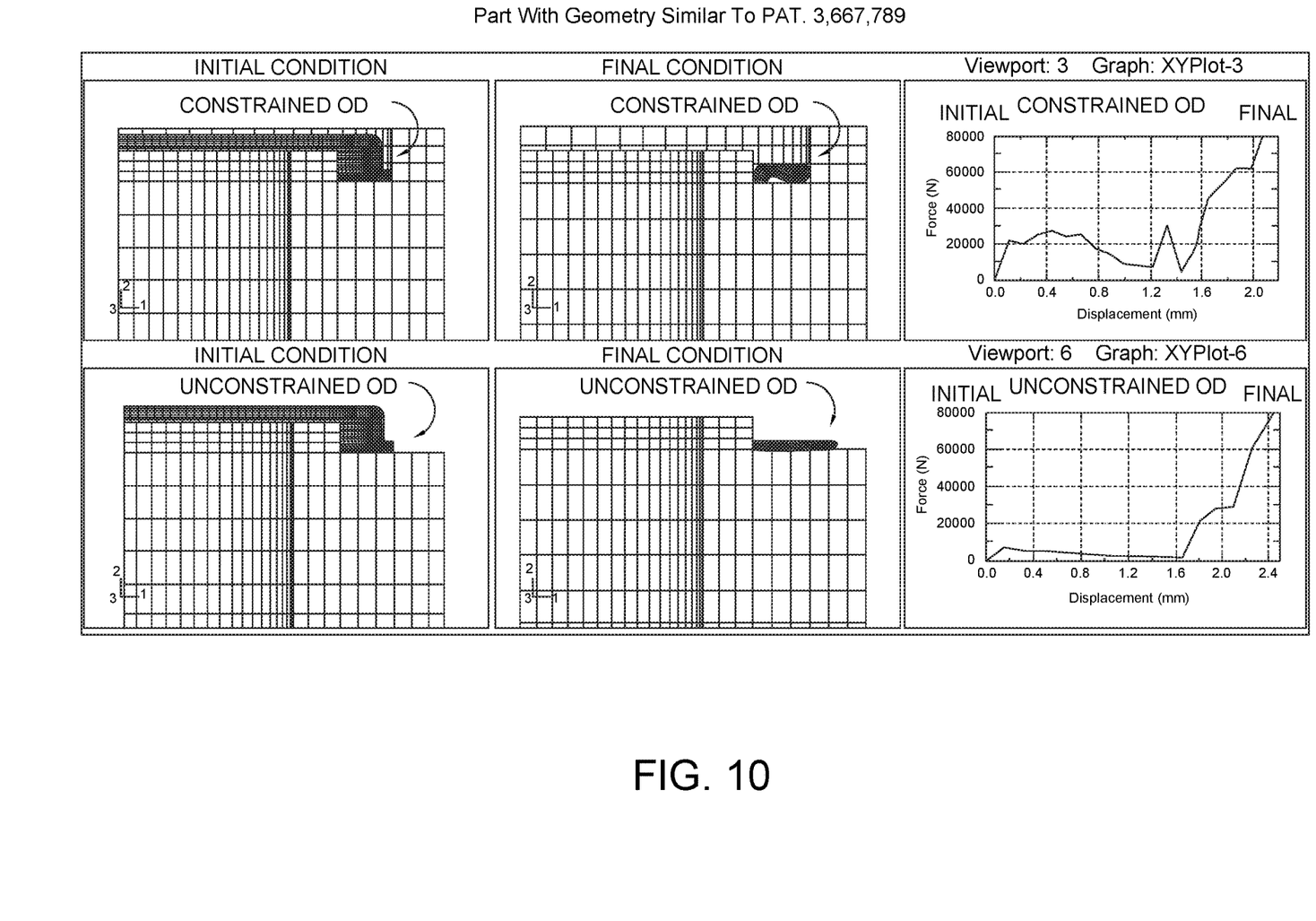

In comparing FIGS. 9 and 10, it can be seen from the force displacement curves that the force resistance of the wave shaped tolerance absorbing spacer shown in FIG. 1 is significantly greater and more consistent for both con-strained and non-constrained OD cases as compared to a tolerance control spacer of geometry similar to that shown in U.S. Pat. No. 3,667,789. One of the important features of the tolerance absorbing spacers 6 is the ability to support and resist a sufficiently high applied force before non-elastic yielding occurs. This provides a socket wherein the tolerance absorbing spacer 6 will not be further compressed during any foreseeable normal condition of use, or that it would fracture from fatigue, over the expected life of the socket. It is additionally required that any elastic return or spring-back of the tolerance absorbing component be consistent over the entire operating tolerance range of the socket as determined by cumulative axial tolerance possibilities of each components that makes up the socket assembly stacked together in their combination of normal axial extremes. It is a further requirement of the tolerance absorbing spacer that it be designed to perform in a narrow space of ID/OD as is required for some styles of sockets for example as in FIG. 6. It must also function in a stable and predictable manner in all extreme normal sets of tolerance conditions without sticking. Thus an additional requirement of the tolerate absorbing spacer 6 is that the outside and inside diameters expand and contract by a limited and predictable amount for all tolerance compensation positions within the required range of operation. The tolerance absorbing component must also provide stable functioning even when the presetting force is applied at a slightly oblique angle (e.g. up to 3 degrees) to the center axis of the socket assembly.

In use, it is important that the tolerance absorbing spacer 6 not plastically deform until a specified minimum external force is applied. This is necessary to provide a component that cannot be further compressed during normal use, which could lead to premature loosening and failure of the socket assembly. The force required to deform the tolerance absorbing spacer 6 is significantly more consistent and stable as compared to a part with geometry similar to that of the prior art configuration in U.S. Pat. No. 3,667,789. Furthermore, the present tolerance absorbing spacer 6 is useful in assemblies with very narrow operating confines of ID/OD where the prior art component-style geometry could not be reliable used. When used in an environment with narrow ID/OD operating space, for example some chassis part ball joint products, the components made with geometry similar to the prior art teaching develop inconsistent and unacceptable low plastic deformation force limits and also have an undesirable tendency to expand under compression. This reduces the ID and or significantly increases the OD. This has the undesirable result of creating interference between the tolerance absorbing spacer of the prior and the side walls of the surrounding components within the socket resulting in sticking between the tolerance absorbing spacer and adjacent components. This is extremely undesirable and can provide false information about the state of clearance inside the assembly. The requirement that tolerance absorbing spacer 6 have a consistent spring back after presetting within the required operating range of use is necessary to predict the clearance that will remain within the socket after presetting from all combinations of component tolerance (axial stack height).

In view of the above, it will be seen that advantageous results are attained. As various changes could be made in the above constructions without departing from the scope of the invention, it is intended that all matter contained in the above description or shown in the accompanying drawings shall be interpreted as illustrative and not in a limiting sense.

What is claimed:

1. An automotive socket assembly comprising:
a housing having a concave bearing surface;
an upper bearing;
a ball stud passing through an open end of the housing, said ball stud having a protruding shaft and a convex bearing surface, received in the housing and supported between axially aligned concave bearing surface and said upper bearing;
a wave shaped tolerance absorbing spacer sandwiched between said upper bearing and a closed or closable end of the housing;
an elastic preload washer sandwiched between said upper bearing and said spacer,
said spacer plastically deformed by a force applied substantially in the axial direction leaving a controlled and desirable socket clearance space in the assembly, the spacer having a consistent and minimal amount of elastic rebound within a socket tolerance variation to be compensated after being plastically deformed, once a minimum required force for plastic deformation has been met, said spacer comprising a flat annulus with a plurality of wave forms in the axial direction and extending around the annulus, each of said wave forms having a constant amplitude from an outside diameter to an inside diameter of the annulus, said spacer removing undesirable internal clearance between the components within said socket assembly.

2. The socket assembly of claim 1 wherein the elastic preload washer is a Belleville washer.

3. The socket assembly of claim 1 wherein the plurality of wave forms are evenly spaced.

4. The socket assembly of claim 1 wherein the plurality of wave forms are unevenly spaced.

5. The socket assembly of claim 1 wherein the spacer is plastically deformed prior to a final assembly.

6. The socket assembly of claim 1 wherein the spacer is plastically deformed prior to an initial assembly.

* * * * *